United States Patent [19]

Rodgers

[11] Patent Number: 5,461,815
[45] Date of Patent: Oct. 31, 1995

[54] FISHING LURE

[76] Inventor: Nicholas A. Rodgers, c/o Shaw & Co. SJO 892, P.O. Box 025216, Miami, Fla. 33102-521

[21] Appl. No.: 234,110

[22] Filed: Apr. 28, 1994

Related U.S. Application Data

[63] Continuation-in-part of Ser. No. 72,390, Jun. 7, 1993, Pat. No. 5,330,282.

[51] Int. Cl.$^6$ .................................................. A01K 85/00
[52] U.S. Cl. ............................................................ 43/17.6
[58] Field of Search ................................ 43/17.6, 42.31

[56]  References Cited

U.S. PATENT DOCUMENTS

| | | | |
|---|---|---|---|
| 2,217,565 | 10/1940 | Seigle | 43/17.6 |
| 2,598,471 | 5/1952 | Waite | 43/17.6 |
| 2,897,623 | 8/1959 | Flournoy | 43/17.6 |
| 3,001,315 | 9/1961 | Zimmerman | 43/17.6 |
| 3,077,046 | 2/1963 | Murray | 43/17.6 |
| 3,535,812 | 10/1970 | Crecelius | 43/17.6 |
| 3,940,868 | 3/1976 | Northcutt | 43/17.6 |
| 4,114,305 | 9/1978 | Wohlert | 43/17.6 |
| 4,175,348 | 11/1979 | Ray | 43/17.6 |
| 4,227,331 | 10/1980 | Ursrey | 43/17.6 |
| 4,250,650 | 2/1981 | Fima | 43/17.6 |
| 4,347,681 | 9/1982 | Fima | 43/17.6 |
| 4,426,803 | 1/1984 | Helling | 43/17.6 |
| 5,159,773 | 11/1992 | Gentry | 43/17.6 |
| 5,175,951 | 1/1993 | Fructrey | 43/17.6 |

FOREIGN PATENT DOCUMENTS 0759073  9/1980  U.S.S.R. .................................. 43/17.6

Primary Examiner—Kurt Rowan
Attorney, Agent, or Firm—Dowell & Dowell

[57]  ABSTRACT

A fishing lure contains a light source which when OFF is turned ON by the transition from disconnected to connected state of a device which acts as a switch. The device includes a conducting body with a defined locus of movement for said body during motion of said lure, and a pair of contacts adapted to be connected or disconnected by said body at various locations in said locus. The movement of said body causes it to make mechanical impacts and the vibrations from said impacts are transmitted to the water surrounding said lure.

8 Claims, 3 Drawing Sheets

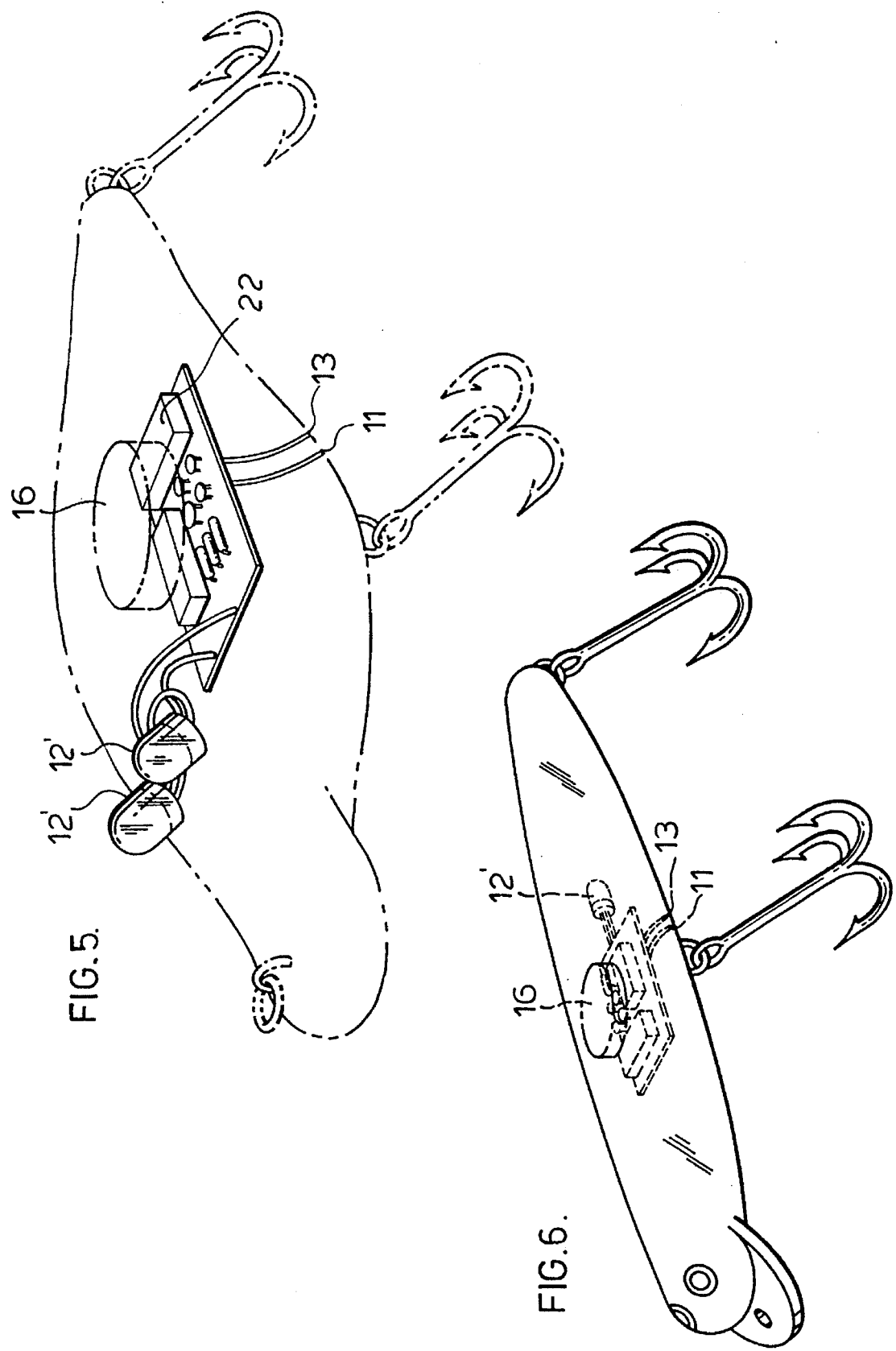

FISHING LURE

This application is a continuation-in-part of application Ser. No. 08/072,390 filed Jun. 7, 1993, now U.S. Pat. No. 5,330,282.

This invention relates to the provision of an intermittently illuminated fishing lure which, at the same time produces acoustic or pressure waves in the water surrounding the lure. A fish is sensitive to such waves and it is believed that these waves increase the attractiveness of the intermittently illuminated lure to the fish.

While most of the contemplated uses of my invention contemplate a fishing lure which is used in trolling or casting or jogged up and down, the invention also extends to any stationary device which is associated with the hook or bait during ice fishing which normally remains stationarey until agitated by a fish. Thus the term 'lure' as used extends to such stationary device and may simply comprise a light and the wave producing apparatus claimed in association with a hook or a net without added shaping or styling.

It is believed and established in practice that a light on a fishing lure tends to attract fish and increase the possibility of a catch. This invention provides a lure where a light will flash irregularly to attract the fish and which will provide contemporaneously, pressure or acoustic waves in the water surrounding the line which increase the attractiveness of the illuminated lure to the fish.

It is an object of this invention to provide a fishing lure, suitable for fresh water or ocean fishing, wherein a light source is mounted thereon, selectively connected with a power source and having motion responsive means designed to switch said light source between ON and OFF in response to motion of the lure in the water. At the same time the lure is designed to produce acoustic (which hereinafter includes 'pressure') waves in the surrounding water. During the ON intervals, the flashing and the acoustic wave serve to attract the fish to the lure when being trolled or otherwise agitated. In ice fishing with the lure sitting still in the water, the light appearing as a result of lure movement may serve to alert the fishermen that a fish is near the hook.

It is noted that within the scope of the invention, a timing circuit, (preferably an integrated circuit) may be used to control illumination duration start or stop times when illumination is called for by the motion responsive means. In a preferred embodiment a timing circuit (whether integrated or otherwise) is provided designed to limit the illumination to a set period after the switch has gone ON. The timing circuit, designed to limit illumination duration will thus prevent loss of battery power if the lure is stored in an attitude which would maintain switch closure for an extended period.

Thus with this aspect of the invention, the light cannot be on continuously, but only for a predetermined interval after the switch goes to ON state. The battery life is thus prolonged and an exciting flashing effect is produced.

The motion-actuated ON state provided by this invention provides a higher attraction to the fish than previous systems. U.S. Pat. Nos. to Ray 4,175,348 and Garr 4,888,905 disclose circuits where an oscillator flashes a light on a fishing lure on and off in accord with a predetermined pattern. The fish will become conscious of such a pattern and will thereafter tend to ignore the lure. This is not only true of lures suspended in the water but is also true of fishing with lures where the lure customarily rests on the sea or lake bottom. With the Ray or Garr circuits the pattern of lighting appears unnatural in a lure resting on the bottom. The appearance is more natural with applicant's invention where the bottom-resting lure only flashes when it is jerked.

In its timing and circuitry aspects this invention will be found to use many of the circuit features discussed in my U.S. Pat. No. 4,848,009 dated Jul. 18, 1989.

It is an object of a preferred aspect of the invention to provide the fishing lure in which the light source is a light emitting diode (LED).

The use of a LED produces a bright display in selected colours which requires much less energy than would the use of incandescent illumination, thus giving longer battery life. Since LED's require less power than other sources, (e.g. incandescent lights), the battery and other circuit components may be of smaller size and cost. Such smaller size is of considerable importance in a fishing lure. LED's also provide a relatively high intensity relative to their power requirements.

It is noted that an optic fibre or fibres may be used, if desired, to conduct light from the light source to the exterior of the lure. In a preferred aspect of the invention the circuitry only allows the light source to be illuminated on change of the switch to 'ON' state and terminates the illuminations a predetermined period after the switch changes state from 'OFF' to 'ON'.

The principal novel feature introduced in this application is the provision of an on-off or connect-disconnect switch for the light operating circuitry which also produces the pressure waves or acoustic waves exterior to the lure. Thus the invention provides two spaced terminals forming part of the circuit and a conducting body movable within a locus of movement, which locus includes locations which connect, and locations which do not connect said spaced terminals. The body thus closes the switch when it connects the two spaced terminals and when it does not the switch is open. The body, as it moves about its locus is caused to have mechanical impacts. Such impacts create vibration in the body of the lure, or parts thereof, which vibrations are transmitted to the surrounding water as acoustic waves.

(Without limiting the scope of the invention it is desired to give an example which will illustrate the operation of the invention. The mercury switch which was used in my application, 08/072,390, now U.S. Pat. No. 5,330,282 is, in an example of the present invention, replaced by a small container which may be attached to the circuit board of the lure. Facing the inside of the container are spaced circuit terminals which are preferably 'traces' etched on the circuit board. A conducting body such as a disk or a screw is allowed to move freely in the container. The body and the terminal are arranged so that as the body moves or rattles about it, thus producing mechanical impacts, it sometimes connects the terminals and sometimes does not. When the body connects and disconnects the terminals, it acts in the circuit as the closing and opening of a switch. The mechanical impacts of the body on the walls of the container, the terminals or the circuit board cause vibration of the lure which is transmitted as acoustic or pressure waves in the surrounding water).

In a preferred embodiment of the invention, the circuitry is designed to include a pair of probes having ends exposed to the outside of the lure which act as sensors to determine whether the probes (and hence the lure) are immersed in water or not. The circuitry is designed so that when there is a conducting or 'connected' path between the probes, caused by the immersion in water, the light source is ON or responsive to the next disconnected to connected transition of the motion responsive switch. However in the absence of a conducting path between the probes (thus they are 'disconnected'), such as when the probes are in air, the light source will not be illuminated, whether or not the motion responsive switch effects a disconnected to connected transition.

Thus in the preferred embodiment last described, the light source will only be ON:

within a timed interval after a disconnected to connected transition of the spaced terminals which transition has taken place with the probes immersed in water when the light is OFF (or in the much less likely possibility that the probes become conducting when light is OFF and the switch is connected). Thus the chances for dissipation of battery power are minimized to allow extended battery life. Battery life may thus be extended to a degree that the battery will outlive the attactiveness or availability of the lure to its owner. Hence the battery and circuitry may be completely enclosed in plastic subject only to exposure of the probe ends, if used, to ambient water and the light source to exterior visiblility. Such encapsulation as protection against ambient water is material to extending the lure life and particularly the life of its circuit components, particularly, the battery.

In drawing which illustrate preferred embodiments of the invention:

FIG. 5 shows a perspective view of a fishing lure in accord with the invention.

FIG. 6 shows a perspective view of an alternative fishing lure in accord with the invention.

Figure 1:
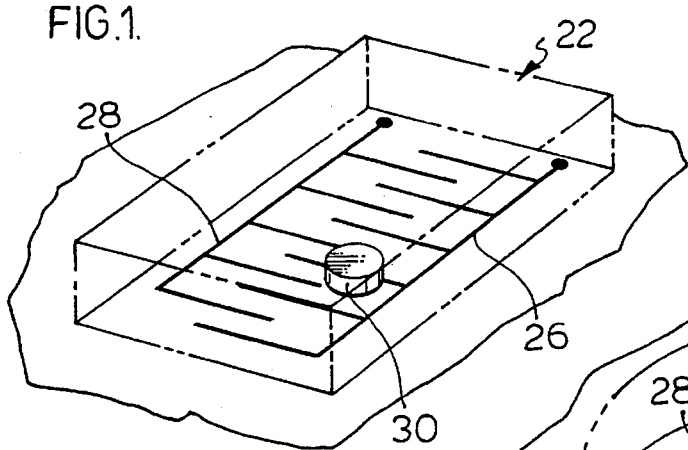
FIG. 1 shows a switch for use with the lure of the invention.

In the drawings, FIG. 1 shows a scrap view of the circuit board 20 having attached thereto an open downward rectilinear container 22 (shown in dotted form in FIG. 1 and having side walls 24.) Conductors are exposed on the top of the circuit board to define the switch 'contacts' 26 and 28. As shown the fingers of the contacts 26 and 28 are interleaved while remaining spaced from each other. A conducting disk 30 is freely movable in container 22 and will at times electrically connect fingers of the respective contacts 26 and 28 and at other times not.

Figure 2:
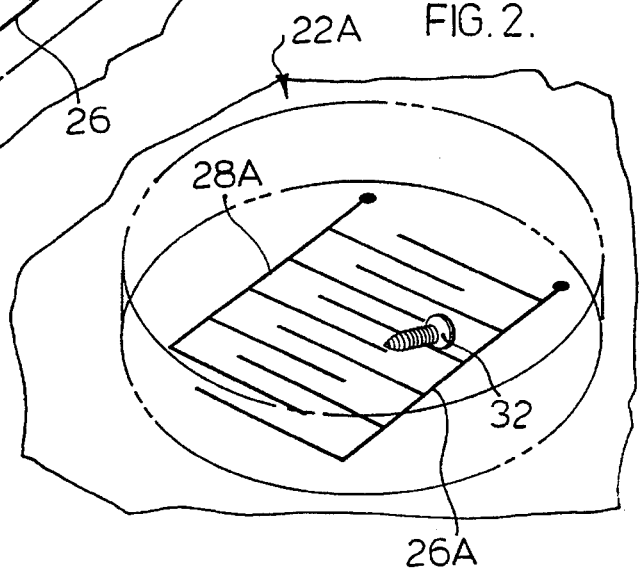
FIG. 2 shows and alternate switch for use with the invention.

FIG. 2 shows that, if desired, the container (here 22A) may be circular in plan and that conducting screw (or bolt) 32, shaped to sometimes, but not always connect the contacts 26A and 30A may be provided.

In either FIG. 1 or FIG. 2 it will be noted that as the disk 30 or the screw 32 move in their respective containers they mechanically impact against: the container walls, the circuit board and the fingers.

Figure 3:
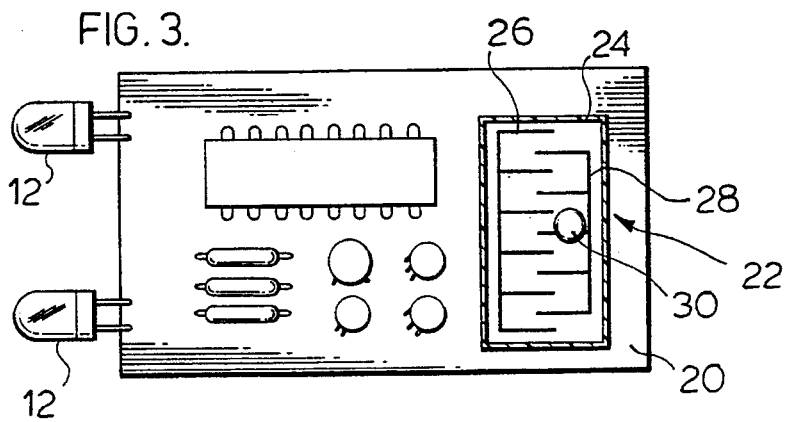
FIG. 3 shows a schematic plan view of the circuitry with the battery omitted.
Figure 4:
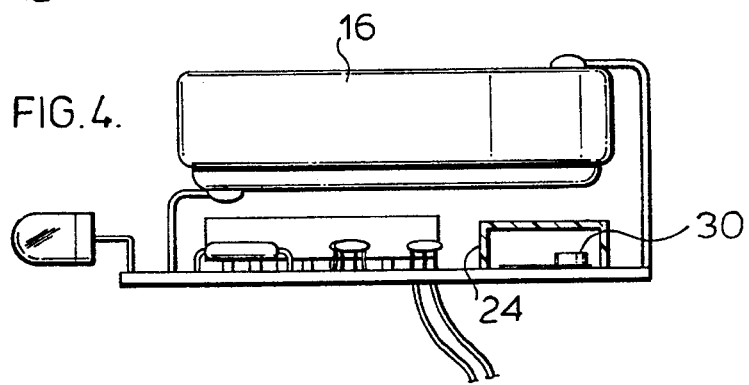
FIG. 4 shows a schematic plan view of the circuitry with the battery illustrated.

FIGS. 3 and 4 show schematically an exemplary physical arrangement of the circuit components, which are not described in detail as any desired arrangement, of suitable components, may be used. Shown in FIG. 3 or FIG. 4 is the battery 16, LED's 12 found also in FIG. 7 and the container 22 with contacts 26 or 28 and circuit board 20. Schematic indications of transistors, resistances and capacitances are also provided.

Figure 7:
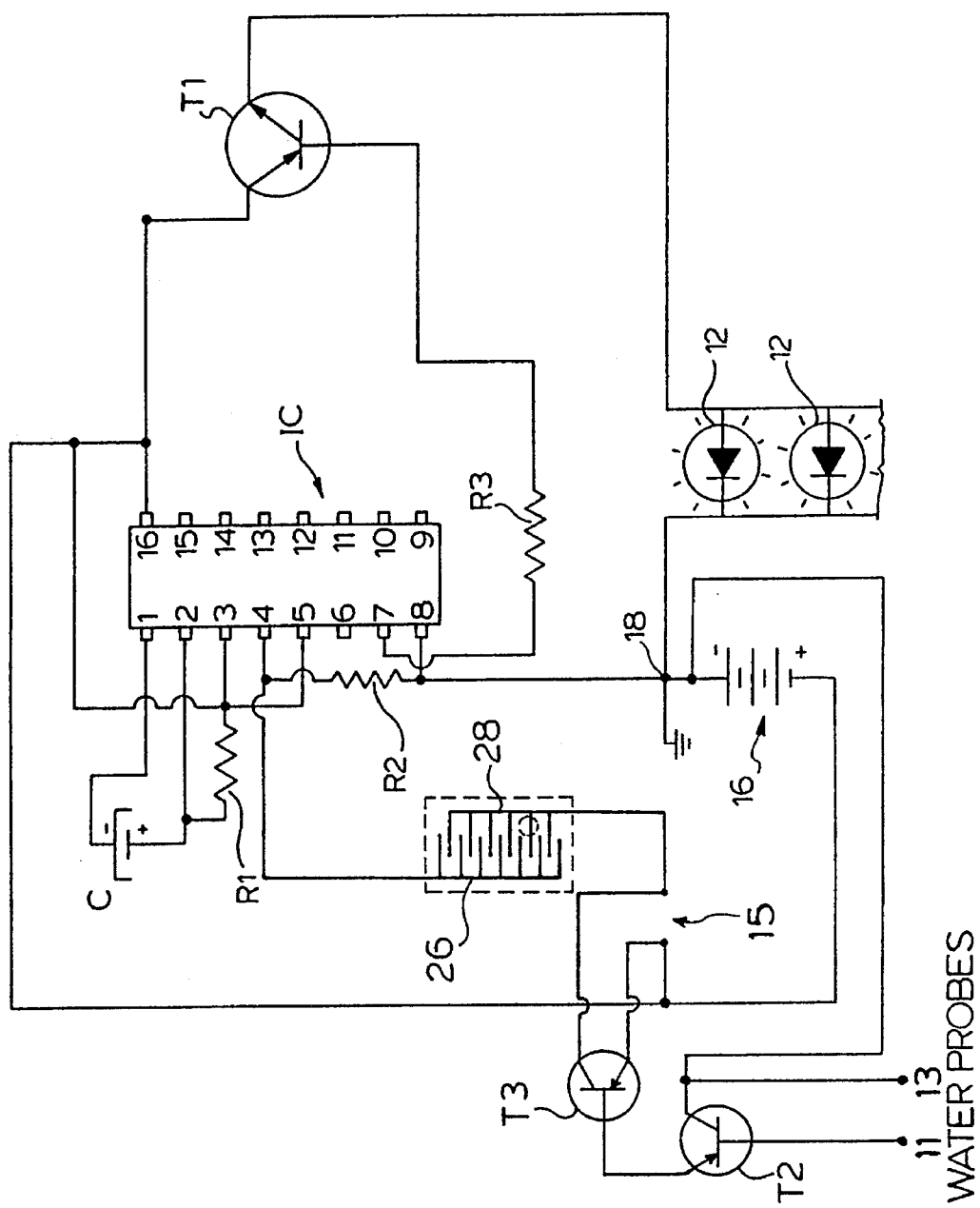
FIG. 7 shows circuitry for use with the lures of FIG. 5 or 6.

In FIG. 5 is shown the circuit board 20 with elements (see FIGS. 3 and 4) attached thereto. The battery 16 is shown in dotted form. In particular container 22 is shown attached to the circuit board. Probes 11 and 13 exposed at the surface of the lure body are connected, as hereinafter described, to detect a water environment surrounding the lure. The probes 11 and 13 are connected as shown in FIG. 7. Preferably the: battery 16, switch 26–28, and the remaining elements attached to the circuit board, their connecting wires, and the lines to the exposed probe ends, and connecting wires to the LEd's 12; are molded into the lure body, which is preferably of molded plastic. If desired the lure may be designed so that the battery may be replaced but this will not usually be considered econmical since the preferred circuit tends to extend battery life beyond the time when the user tires of or loses the lure. In the embodiment of FIG. 5 the LED's are mounted exterior to the lure body. Fingers 26 and 28 in container 22 provide, with disk 30, the switch and depending on the position of the disk 30 will be in connected or in disconnected state depending upon whether fingers 26 and 28 are electrically connected or not by the disk. However disk 30 will obviously move between disconnected and connected states, relative to contacts 26 and 28 when the lure is agitated. When the lure is agitated, disk 30 will impact on its container, the terminals or the board and the resulant vibration of the lure will transmit the acoustic waves to the surrounding water.

Encapsulation of the lure may thus cover the body-adjacent ends of the transparent LED lenses 12' (leaving light from the LED's visible exterior to the lure through the exposed portion of the lenses). Encapsulation of the lure will leave exposed to the ambient water or air, the probe ends 11 and 13.

In the alternative form of the lure in FIG. 6 all elements, including LED 12 (not shown) in lens 12' are located inside the lure body and may be molded therein. In the alternative of FIG. 6 the plastic forming the light path between the LED lens 12' and the outside of the lure will be made transparent or translucent to be visible by the fish. Thus the entire device of FIG. 2 may be encapsulated in plastic, subject only to allowing contact by ambient water with the ends of probes 11 and 13, and an optical path to the exterior for light from the LED's. When the container 22 or 22A is used, the impacts of the disk or screw will cause the lure to transmit acoustic or pressure waves.

The preferred circuitry for a lure is shown in FIG. 7.

FIG. 7 shows circuitry including an integrated circuit used to time illumination of LED's 12. It will be understood that the switch 26–28, battery 16, LED's 12 or lenses 12' may be located as indicated in FIGS. 5 or 6 or otherwise. The integrated circute IC, transistor T1, T2, and T3 and the remainder of the elements (with the exception of the ends of probes 11 and 13) shown in FIG. 7 are encapsulated in the material of the lure, preferably adjacent container.

Preferred values for the circuit elements are as follows:
IC—INTEGRATED CIRCUIT #RR8503 MC14528
T1—TRANSISTOR #2N3906
T2—TRANSISTOR #2N3906
T3—TRANSISTOR #2N3906
C—CAPACITOR . 47 μF at 30 V
30—BATTERY 3 V
12—LIGHT SOURCE (LED)
R1—RESISTOR 1 MEGOHM ⅛w
R2—RESISTOR 1 MEGOHM ⅛w
R3—RESISTOR 1 MEGOHM ⅛w The 'switch' comprising terminals 26, 28 and disk 30 may be replaced by any equivalent device where disk 30 is replaced by any conducting body with a limited locus of movement twisted to move between locations in said locus where it connects contacts replacing 26 and 28 and locations where it does not And making mechanical impacts in as it moves.

(The integrated circuit and transistors referred to above are both available from Motorola Canada Limited, 3125 Steeles Avenue East, North York, Ontario, Canada).

In operation, with the lure stationary, if disk 30 is not connecting contacts 26 and 28 in the stationary attitude of the lure, the terminals 26,28 will be disconnected and the circuit quiescent but capacitor C will be charged to the value of battery 16 (here 3 V). Pin 4 of the integrated circuit will be held at 0 volts which is the voltage arbitrarily designated at node 18. The integrated circuit IC will be in reset condition having the effect that there will be a positive voltage at pin 7, rendering the transistor T1 non-conducting and maintaining LED's 12 off. With the lure stationary, if the disk 30 is connecting contacts 26,28 the circuit will, after a momentary flash of the LEDs, will be OFF.

In series with the contacts 26,28 there is provided a closable gap 15 in the contact 28 connection to the positive end of battery 16, controlled by probes 11 and 13 and transistors T2 and T3 connected as shown. If probes 11 and 13 are in an air environment, there is no conduction path therebetween and hence there is no bias on the base of T2 which is therefore non-conducting rendering T3 non-conducting. Gap 15 thus acts as an open circuit and while such open circuit persists, and the circuitry cannot be activated by a connected to disconnected transition caused by disk 30 connecting contacts 26,28. Thus LED's 12 cannot be lit by such transition when probes 11 and 13 are in air. This prevents the expenditure of battery energy when the lure is not in the water.

On the other hand when probes 11 and 13 are immersed in water (and the circuitry may be adapted for fresh or sea water), the water establishes a conducting path between probes 11 and 13. This turns the base of T2 negative relative to the emitter to turn on T2. When T2 turns on, the requisite negative bias is then applied to transistor T3 to turn it on. Turning on T3 closes the conducting path between the positive terminal across gap 15 to contact 28.

With gap 15 closed because probes 11 and 13 are in water the next following disconnected to connected transition of contacts 26,28 will activate the circuitry as hereinafter described.

Thus with probes 11 and 13 immersed in water, motion of the lure causes disk 30 moving to connect contacts 26,28 to complete a connection between battery 16 and pin 4, (that is the 26,28 connection is changing state from disconnected to connected) the (0–1) or 0 V to 3 V transition at pin 4 causes the integrated circuit to go to "set" condition causing pin 7 of the integrated circuit IC to go to 0 volts. This causes transistor T1 to conduct, turning LED's 12 to ON. The set condition of IC connects pin 3 with node 18 and in a time determined by C and R1 the circuit is returned to reset condition, extinguishing LED's 12 (to 'OFF') and allowing C to recharge. The circuitry is further designed so that switch 26 must be disconnected and connected again before the integrated circuit can again be activated to "set" state.

Meanwhile motion of the lure will cause mechanical impacts of disk 30 on its neighbouring elements, causing vibration of the lure and the emission of acoustic or pressure waves in the water.

It will be appreciated that the 'ground' shown at node 18 is instrument ground only and is unconnected to anything outside the lure. The choice of node 18 as 'ground' is somewhat arbitrary but assists on the descrption of the circuit.

The use of the circuitry shown in FIG. 3 transcends the need for an "off" attitude of the lure, when stationary or not in use to conserve battery power, as it provides a maximum one brief illumination of the LED's per connection of the contacts 26,28. This allows the lure to be held or left where, due to the attitude of the lure, contacts 26,28 are connected without continuing illumination of the LED's and consequent battery 16 power depletion.

In summary then, (with probes 11,13, if used, in water) the LED's are turned ON by the transition of the contacts 26,28 from disconnected to connected state when the LED(s) are OFF and remain ON until turned off by the timing circuit. (If contacts 26,28 become disconnected during the timed interval the circuitry will usually be designed to continue the LED ON until the end of the interval). The LED's are OFF after the end of the timed interval until the later time of connection of terminals 26,28.

Obviously it is within the scope of the invention to use any other circuit, integrated or otherwise, designed to be activated by motion causing a disconnected to connected transition of the 26,28 contacts and to cause the cessation of duration of the illumination of LED's 12. Circuits to control the duration are of particular importance for the reasons previously explained. (Integrated circuits are or shortly will be available which incorporate resistors R1, R2, R3 and capacitor C into a chip.)

Obviously there is no limitation as to the type of lure with which the invention may be used and the lure may simply be a light, battery and switching contacts used in accociation with a hook or net.

(It may be worthwhile to note that if contacts 26,28 were, during an interval, maintained in connected state, then immersion of the lure would close gap 15 and appear to the integrated circuit as a disconnect-to-connect transition of the terminals 26,28. Similarly removal of the lure from water with the terminals 26,28 connected will look to the integrated circuit like a connect to disconnect transition. However, it is extremely unlikely that contacts 26,28 would remain connected during such changes in gap 15 and if it does occur, the delay circuit will control the duration of the ON state of the LED's, exactly as described for contacts 26,28 disconnect-connect changes, so that no disadvantages ensue and the advantages of the invention accrue).

I claim:

1. Fishing lure comprising:

a lure body, a power source, a circuit including timing means for timing an interval, a connection forming part of said circuit including terminals adapted to be connected and disconnected, at least one light source having ON and OFF states, said circuit being adapted to respond to the change of said connection means to connected state when said light source is OFF, to turn said light ON and to turn it OFF after said interval, a means for connecting said terminals comprising a conducting article having a defined locus of movement and movable freely and rattling on normal motion of said lure through the water and adapted during such movement to connect and disconnect said terminals.

2. Fishing lure as claimed in claim 1 wherein said circuit and the electrical components connected thereto, are sealed from contact with water surrounding said lure.

3. A fishing lure comprising:

a circuit including a pair of terminals, a conducting object, mounted to move freely on normal motion of said lure through the water, means defining a locus of movement for said conducting object, which locus includes locations and orientation which: (a) do, and (b) do not, connect said terminals, means causing said object to experience mechanical impacts when moving in said locus of movement, a light having ON and OFF states, means/responsive to the connection of said terminals, when said light is in an OFF state to turn said light to ON state, means responsive to the transition of said light to ON state, to turn said light OFF after an interval.

4. Fishing lure as claimed in claim 3 wherein said circuit and the electrical components connected thereto, are sealed from contact with water surrounding said lure.

5. Fishing lure comprising:.

a lure body, a power source, a circuit including timing means for timing an interval, a connection forming part of said circuit including terminals adapted to be connected and disconnected, at least one light source having ON and OFF states, said circuit being adapted to respond to the change of said connection means to connected state when said light source is OFF, to turn said light ON and to turn it OFF after said interval, a means for connecting said terminals comprising a conducting article having a defined locus of movement and adapted to rattle when moving within said locus and adapted during such movement to connect and disconnect said terminals, including a pair of conducting probes, with ends exposed at the surface of said body, means connecting said probes to said circuit, said circuit being adapted to prevent said light being turned on when said ends are not immersed in water.

6. Fishing lure as claimed in claim 5 wherein said circuit and the electrical components connected thereto, except said exposed probes, are sealed from contact with water surrounding said lure.

7. A fishing lure comprising:

a circuit including a pair of terminals, a conducting object, means defining a locus of movement for said conducting object, which locus includes locations and orientation which: (a) do, and (b) do not, connect said terminals, means causing said object to experience mechanical impacts when moving in said locus of movement, a light having ON and OFF states, means responsive to the connection of said terminals, when said light is in an OFF state to turn said light to ON state, means responsive to the transition of said light to ON state, to turn said light OFF after an interval, including a pair of conducting probes with ends exposed at the surface of said body, means connecting said probes to said circuit, said circuit being adapted to prevent said light being turned ON when said probes are not immersed in water.

8. Fishing lure as claimed in claim 7 wherein said circuit and the electrical components connected thereto, except said exposed probes, are sealed from contact with water surrounding said lure.

* * * * *